(12) United States Patent
Li et al.

(10) Patent No.: US 10,377,946 B2
(45) Date of Patent: Aug. 13, 2019

(54) SELF-PASSIVATING QUANTUM DOT AND PREPARATION METHOD THEREOF

(71) Applicant: SHANGHAI JIAO TONG UNIVERSITY, Shanghai (CN)

(72) Inventors: Liang Li, Shanghai (CN); Zhichun Li, Shanghai (CN)

(73) Assignee: SHANGHAI JIAO TONG UNIVERSITY, Shanghai (CN)

(*) Notice: Subject to any disclaimer, the term of this patent is extended or adjusted under 35 U.S.C. 154(b) by 256 days.

(21) Appl. No.: 15/314,820

(22) PCT Filed: Jan. 6, 2015

(86) PCT No.: PCT/CN2015/070161
§ 371 (c)(1),
(2) Date: Nov. 29, 2016

(87) PCT Pub. No.: WO2016/086511
PCT Pub. Date: Jun. 9, 2016

(65) Prior Publication Data
US 2017/0247614 A1    Aug. 31, 2017

(30) Foreign Application Priority Data

Dec. 5, 2014 (CN) .......................... 2014 1 0741933

(51) Int. Cl.
| | | |
|---|---|---|
| *C09K 11/88* | (2006.01) | |
| *C09K 11/64* | (2006.01) | |
| *C09K 11/70* | (2006.01) | |
| *B82Y 20/00* | (2011.01) | |
| *B82Y 40/00* | (2011.01) | |
| *B82Y 30/00* | (2011.01) | |

(52) U.S. Cl.
CPC .......... *C09K 11/883* (2013.01); *C09K 11/642* (2013.01); *C09K 11/703* (2013.01); *B82Y 20/00* (2013.01); *B82Y 30/00* (2013.01); *B82Y 40/00* (2013.01); *Y10S 977/774* (2013.01); *Y10S 977/818* (2013.01); *Y10S 977/824* (2013.01); *Y10S 977/892* (2013.01); *Y10S 977/896* (2013.01); *Y10S 977/95* (2013.01)

(58) Field of Classification Search
CPC ... C09K 11/883; C09K 11/642; C09K 11/703; B82Y 20/00; B82Y 40/00; B82Y 30/00; Y10S 977/774; Y10S 977/813
See application file for complete search history.

(56) References Cited

U.S. PATENT DOCUMENTS

2007/0194279 A1* 8/2007 Peng ...................... C09K 11/02
                                                                    252/301.4 F
2012/0175588 A1* 7/2012 Qiao .................... C09K 11/883
                                                                    257/13

FOREIGN PATENT DOCUMENTS

| CN | 1569619 A | 1/2005 |
|---|---|---|
| CN | 101585515 A | 11/2009 |
| CN | 101948686 A | 1/2011 |
| CN | 103058274 A | 4/2013 |
| CN | 103113881 A | 5/2013 |
| CN | 103952136 A | 7/2014 |
| CN | 104733180 A | 6/2015 |

OTHER PUBLICATIONS

Derwent abstract 2014-V38876 for CN 104017573, Sep. 3, 2014.*
International Search Report dated Jun. 5, 2015 from corresponding application No. PCT/CN2015/070161.
Z. Li et al., General Method for the Synthesis of Ultrastable Core/Shell Quantum Dots by Aluminum Doping, J. Am. Chem. Soc., Sep. 21, 2015.
P. Rao et al., Highly stable CuInS2@ZnS:Al core@shell quantum dots: the role of aluminium self-passivation, Chem. Commun., Apr. 17, 2015.

* cited by examiner

*Primary Examiner* — C Melissa Koslow
(74) *Attorney, Agent, or Firm* — Wayne & Ken, LLC; Tony Hom

(57) ABSTRACT

The invention relates to a self-passivating quantum dot and a preparation method thereof. The quantum dot is doped with a self-passivating element M and the self-passivating element M ranges from 0.1 wt % to 40 wt % in content. The self-passivating element M is selected from the group consisting of Al, Zr, Fe, Ti, Cr, Ta, Si, and Ni. The preparation method comprises the steps of: adding a quantum dot core and a solvent into a reaction vessel, controlling the temperature to be 100-120° C. and vacuumizing the reaction vessel for 30-50 min; filling the reaction vessel with inert gas, and rising the temperature to 230-280° C.; and injecting a coating material precursor solution into the reaction vessel for coating the quantum dot core according to the injection amount being 1 or 2 times by molar concentration of the quantum dot core element to prepare the self-passivating quantum dot.

15 Claims, 3 Drawing Sheets

SELF-PASSIVATING QUANTUM DOT AND PREPARATION METHOD THEREOF

RELATED APPLICATIONS

The present application is a National Phase of International Application Number PCT/CN2015/070161, filed Jan. 6, 2015, and claims the priority of China Application No. 201410741933.6, filed Dec. 5, 2014, which are incorporated herein by reference in their entireties.

TECHNICAL FIELD

The present invention relates to technical field of semiconductor nanomaterial (self-passivating quantum dot) preparation, and more specifically, to a self-passivating quantum dot and preparation method thereof.

BACKGROUND OF THE INVENTION

Its excellent photoelectric property due to special structure causes extensive attention since the discovery of quantum dot. One of most prominent performance of quantum dot is "fluorescence property", which has performances of narrower peak width at half height, small particle, no scattering loss and adjustable spectrum with the size. However, the size of most quantum dot is 3-10 nanometers, surface area is very big, and quantum dot is easy to react with oxygen and water in air in use procedure, and multiple defects are formed on the surface, resulting in quenching fluorescence, and poor stability limits the use of quantum dot greatly.

At present stage, there are mainly two kinds of methods to improve stability of quantum dot: (1) preparing core-shell structure quantum dot to improve stability of quantum dot, however, the effect is limited only by adding thickness of shell layer. (2) improving stability of quantum dot by methods of silicon dioxide coating or macromolecule coating, however, these methods all have deficiencies, in coating process, the surface of quantum dot is damaged to reduce fluorescence efficiency of quantum dot. Therefore, it is an urgent problem to improve stability of quantum dot.

Chinese patent CN 103058274A discloses a preparation method of metal-doped titanium oxide quantum dots, and especially relates to a method for preparing metal-doped titanium oxide quantum dots by using high-temperature oil phase. The invention belongs to the technical field of quantum dots. The method comprises the steps that: (1) a metal titanium compound A and a doping metal compound B are dissolved in a solvent C, such that a solution D is formed; (2) a ligand E is added into the solution D, such that a solution F is formed; (3) the solution F is vacuumed and is charged with nitrogen; a temperature is increased to a required value, and stirring is carried out for a required period of time; the solution is cooled to room temperature; and the vacuuming and nitrogen charging process can be repeated if needed; and (4) the solution F obtained in the step (3) is subjected to centrifugal washing, and is dispersed in a solvent G, such that a metal-doped titanium oxide quantum dot solution is obtained. The invention relates to broadening of absorption of titanium dioxide quantum dot to visible region, however, it does not relate to stability of quantum dot, and the stability of quantum dot is of great importance to actual application.

SUMMARY OF THE INVENTION

The purpose of the present invention is to overcome above deficiencies existed in prior art by providing an ultrastable self-passivating quantum dot and preparation method thereof.

The purpose of the present invention can be realized by following technical schemes: a self-passivating quantum dot, characterized in that the self-passivating quantum dot is doped with a self-passivating element M; wherein the self-passivating element M ranges from 0.1 wt % to 40 wt % in content; and the self-passivating element is selected from the group consisting of Al, Zr, Fe, Ti, Cr, Ta, Si, and Ni.

The quantum dot is a core-shell structure comprising a quantum dot core and a coating material coated outside of the quantum dot core.

The self-passivating element M is doped in a material of the quantum dot core or doped in the coating material.

The coating material is the same or entirely different with the material of the quantum dot core.

The outside of the quantum dot core comprises at least one layer of coating material; and thickness of the coating material is adjusted by regulating and controlling number of a coating layer, and the preferred option is 1-20 layer.

The quantum dot core is a binary structure quantum dot core, a ternary structure quantum dot core or a quaternary structure quantum dot core.

The binary structure quantum dot core is $A_mX_q$, wherein each m and q are integers that are equal to or greater than 1; A is selected from a group consisting of cadmium, zinc, mercury, lead, tin, gallium, indium, calcium, barium or copper, and X is selected from a group consisting of sulfur, selenium, nitrogen, phosphorus, arsenic, tellurium and antimony.

The ternary structure quantum dot core is $A_mA'_nX_q$, wherein each m, n and q are integers that are equal to or greater than 1; A and A' are respectively one of cadmium, zinc, mercury, lead, tin, gallium, indium, calcium, barium or copper, A and A' are different with each other, and X is selected from a group consisting of sulfur, selenium, nitrogen, phosphorus, arsenic, tellurium and antimony.

The quaternary structure quantum dot core is $A_mA'_nA''_pX_q$, wherein each m, n, p and q are integers that are equal to or greater than 1; A, A' and A'' are respectively one of cadmium, zinc, mercury, lead, tin, gallium, indium, calcium, barium or copper, A, A' and A'' are different with each other, and X is selected from a group consisting of sulfur, selenium, phosphorus, arsenic, tellurium and antimony.

The binary structure quantum dot core is preferably cadmium selenide (CdSe) and indium phosphide (InP), and the ternary structure quantum dot core is preferably copper indium sulfur ($CuInS_2$).

The coating material is selected from the group consisting of group II-VI, group II-V, group III-V, group IV-VI, group II-IV-V, and group II-IV-VI semiconductor material, comprising cadmium selenide (CdSe), zinc selenide (ZnSe), mercury selenide (HgSe), cadmium sulfide (CdS), zinc sulfide (ZnS), mercury sulfide (HgS), cadmium telluride (CdTe), zinc telluride (ZnTe), mercury telluride (HgTe), gallium nitride (GaN), indium nitride (InN), gallium phosphide (GaP), gallium antimonide (GaSb), indium gallium phosphide (InGaP), zinc cadmium selenide (ZnCdSe) and cadmium zinc sulfide (CdZnS).

The coating material is preferably cadmium sulfide (CdS) or zinc sulfide (ZnS).

The preparation method of above self-passivating quantum dot, characterized in that the preparation method comprises the following steps:

(1) adding a quantum dot core and a solvent into a reaction vessel, controlling the temperature to be 100-120 DEG C. and vacuumizing the reaction vessel for 30-50 min;

(2) filling the reaction vessel with inert gas, and rising the temperature to 230-280 DEG C.;

(3) adopting an injection reaction method, injecting a coating material precursor solution into the reaction vessel for coating the quantum dot core to prepare the self-passivating quantum dot; wherein the molar ratio of the coating material precursor solution to the quantum dot core is 1:1 or 2:1.

When a coating layer is multilayer, the step (3) is repeated, the coating material is continually formed outside of the self-passivating quantum dot prepared in step (3), and a core-shell structure with multilayer coating material coating the quantum dot core layer by layer.

The precursor of the self-passivating element M is a compound of M (M=Al, Zr, Fe, Ti, Cr, Ta, Ni, Si), comprising M chloride, M bromide, M fluoride, M nitrate, M sulfate, M perchlorate, M phosphate, M acetate, M formate, M oxalate, M propionate, trimethyl M, triethyl M, tripropyl M, triisopropyl M, tributyl M, tri-sec-butyl M, tri-tert-butyl M, tetraisopropyl M, M isopropoxide, M sec-butoxide or M acetylacetonate.

The precursor of the self-passivating element M is preferably M isopropoxide or M acetylacetonate.

The self-passivating quantum dot can be processed by a peroxidating reagent to accelerate forming of passivation layer, and the peroxidating reagent is preferably benzoyl peroxide.

The self-passivating quantum dot can be processed by a plasma generator to accelerate forming of passivation layer.

Above quantum dot core can be prepared by conventional preparation method of quantum dot core.

For example, if the quantum dot core is quantum dot CdSe, it can be obtained by high temperature injection method, comprising following steps:

(1) mixing cadmium oxide, oleic acid and octadecene in a reactor, wherein the molar concentration of the cadmium oxide is 0.01-1 mmol/ml, the volume ratio of the oleic acid and octadecene is 0.01-1 mmol/ml, and vacuumizing the reactor for 30-50 min under 100-120 DEG C.;

(2) filling the reactor with nitrogen, rising the temperature to 280-300 DEG C., when the solution becomes clear, cooling to 270 DEG C.;

(3) rapid injecting trioctylphosphine-selenium solution into the reactor, the molar ratio of the trioctylphosphine-selenium and the cadmium oxide is 1:1-1:2, cooling to 240 DEG C., reacting for 3-5 min, cleaning and obtaining CdSe quantum dot.

If the quantum dot core is self-passivating element doped with binary structure InP, it can be obtained by high temperature injection method, comprising following steps:

(1) mixing indium acetate, myristic acid and octadecene in a reactor, the molar concentration of the indium acetate is 0.01-0.5 mmol/ml, and the molar concentration of the myristic acid is 0.01-0.5 mmol/ml, after filling nitrogen for 20-30 min, heating the temperature to 100-120 DEG C. and keeping the temperature until the solution in the flask becomes clear and transparent;

(2) rising the temperature to 260-300 DEG C. with rate of 10-13 DEG C./min;

(3) rapid injecting tris(trimethylsilyl)-phosphine solution into three-necked flask, cooling to 250 DEG C. and reacting for 10-30 min. After the reaction is completed, cleaning the InP quantum dot and taking it as a core quantum dot stock solution.

When the quantum dot core is self passivated, adding both self-passivating element M precursor solution and precursor of metal component in quantum dot structure (such as precursor of A in binary structure quantum dot, precursor of $A_mA'_n$ in ternary structure quantum dot, and precursor of $A_mA'_nA''_p$ in quaternary structure quantum dot) in a reactor for realizing self-passivating quantum dot core.

When the coating material is doped with self-passivating element M, mixing the precursor solution of self-passivating element M and the coating material precursor solution, injecting the mixture into a reactor, coating on the surface of the quantum dot core, and forming a coating layer doped with self-passivating element M.

Taking self-passivating element M doped with binary structure CdSe as an example to explain, it can be obtained by high temperature injection method, comprising following steps:

(1) mixing cadmium oxide, M isopropoxide, oleic acid and octadecene in a reactor, and the molar concentration of the cadmium oxide is 0.01-1 mmol/ml, the molar concentration of aluminium isopropoxide is 0.01-0.5 mmol/ml, and the volume ratio of the oleic acid and octadecene is 1:1-1:100, and vacuumizing the reactor for 30-50 min under −120 DEG C.;

(2) filling the reactor with nitrogen, rising the temperature to 280-300 DEG C., when the solution becomes clear, cooling to 270 DEG C.;

(3) rapid injecting trioctylphosphine-selenium solution into the reactor, the molar ratio of the trioctylphosphine-selenium and the cadmium oxide is 1:1-1:2, cooling to 240 DEG C., reacting for 3-5 min, cleaning and obtaining aluminum-doped binary structure quantum dot CdSe.

Compared with prior art, the present invention has following advantages:

1. The present invention has simple preparation process, the prepared quantum dot has better appearance and regular nanostructure;

2. Compared with undoped quantum dot, the self-passivating quantum dot prepared by the present invention can effectively prevent erosion of hydrosphere and oxygen to quantum dot because aluminum forms a passivation layer, and the self-passivating quantum dot is significantly improved in photostability.

DETAILED DESCRIPTION OF THE INVENTION

Figure 1:
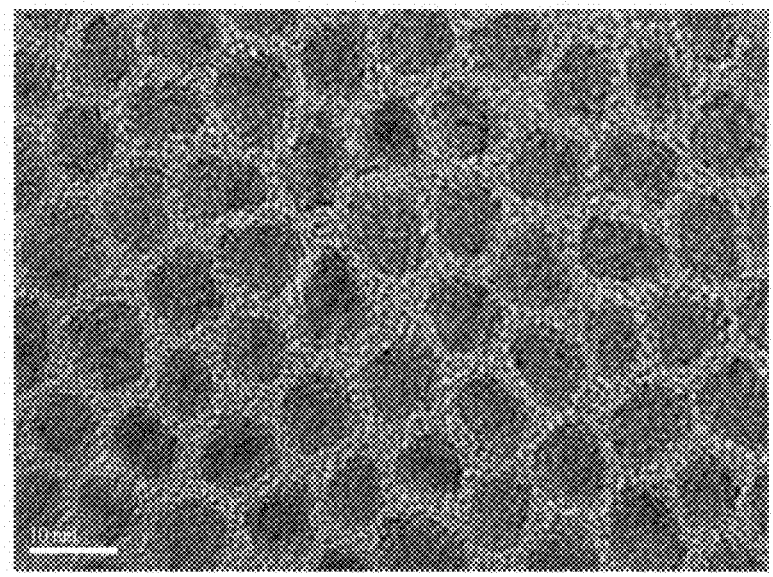
FIG. 1 is TEM picture of aluminum-doped core-shell structure quantum dot.

The preparation method of a self-passivating quantum dot, comprising the following steps:

(1) adding a quantum dot core and a solvent into a reaction vessel, controlling the temperature to be 100-120 DEG C. and vacuumizing the reaction vessel for 30-50 min;

(2) filling the reaction vessel with inert gas, and rising the temperature to 230-280 DEG C.;

(3) adopting an injection reaction method, injecting a coating material precursor solution into the reaction vessel for coating the quantum dot core to prepare the self-passivating quantum dot, where the molar ratio of the coating material precursor solution to the quantum dot core is 1:1 or 2:1.

If the quantum dot core is M-doped (M=Al, Zr, Fe, Ti, Cr, Ta, Si, Ni) or M-undoped, when the quantum dot core is coated, the coating material precursor solution contains or contains no M precursor, if the quantum dot core is M-undoped, the coating material precursor solution contains M precursor, so as to ensure M is doped in the quantum dot, and M ranges from 0.1 wt % to 40 wt % in content in the self-passivating quantum dot.

The quantum dot core can be a binary structure quantum dot core, a ternary structure quantum dot core or a quaternary structure quantum dot core, wherein the binary structure quantum dot core is $A_mX_q$, wherein A is selected from a group consisting of cadmium, zinc, mercury, lead, tin, gallium, indium, calcium, barium or copper, and X is selected from a group consisting of sulfur, selenium, nitrogen, phosphorus, arsenic, tellurium and antimony; the ternary structure quantum dot core is $A_mA'_nX_q$, wherein each m, n and q are integers that are equal to or greater than 1; A and A' are respectively one of cadmium, zinc, mercury, lead, tin, gallium, indium, calcium, barium or copper, A and A' are different with each other, and X is selected from a group consisting of sulfur, selenium, nitrogen, phosphorus, arsenic, tellurium and antimony; the quaternary structure quantum dot core is $A_mA'_nA''_pX_q$, wherein each m, n, p and q are integers that are equal to or greater than 1; A, A' and A'' are respectively one of cadmium, zinc, mercury, lead, tin, gallium, indium, calcium, barium or copper, A, A' and A'' are different with each other, and X is selected from a group consisting of sulfur, selenium, phosphorus, arsenic, tellurium and antimony. The coating material is selected from the group consisting group II-VI, group II-V, group III-V, group IV-VI, group II-IV-V, and group II-IV-VI semiconductor material, comprising cadmium selenide (CdSe), zinc selenide (ZnSe), mercury selenide (HgSe), cadmium sulfide (CdS), zinc sulfide (ZnS), mercury sulfide (HgS), cadmium telluride (CdTe), zinc telluride (ZnTe), mercury telluride (HgTe), indium nitride (InN), gallium nitride (GaN), gallium phosphide (GaP), gallium antimonide (GaSb), indium gallium phosphide (InGaP), zinc cadmium selenide (ZnCdSe) and cadmium zinc sulfide (CdZnS). 2-20 layers outside of the quantum dot core are coated.

For example if the quantum dot core is quantum dot CdSe, it can be obtained by high temperature injection method, comprising following steps:

(1) mixing 16 mmol of cadmium oxide, 16 ml of oleic acid and 40 ml of octadecene into a reactor, and vacuumizing the reactor for 30-50 min under 100-120 DEG C.;

(2) filling the reactor with nitrogen, rising the temperature to 280-300 DEG C., when the solution becomes clear, cooling to 270 DEG C.;

(3) rapid injecting 8 mmol of trioctylphosphine-selenium solution into the reactor, cooling to 240 DEG C., reacting for 3-5 min, cleaning and obtaining CdSe quantum dot.

If the self-passivating quantum dot core is doped with binary structure CdSe, it can be obtained by high temperature injection method, comprising following steps:

(1) adding 16 mmol of cadmium oxide, 16 ml of oleic acid, 1.6 mmol of M isopropoxide and 40 ml of octadecene into a reactor, and vacuumizing the reactor for 30-50 min under 100-120 DEG C.;

(2) filling the reactor with nitrogen, rising the temperature to 280-300 DEG C., when the solution becomes clear, cooling to 270 DEG C.;

(3) rapid injecting 8 mmol of trioctylphosphine-selenium solution into the reactor, cooling to 240 DEG C., reacting for 3-5 min, cleaning and obtaining M-doped binary structure quantum dot CdSe.

The present invention is described in detail with reference to embodiments and drawings.

Embodiment 1

Preparation of Aluminum-Doped CdSe/CdS Core-Shell Structure Quantum Dot

Preparation of CdSe core quantum dot: adding 16 mmol of cadmium oxide, 16 ml of oleic acid, 1.6 mmol of oleic acid and 40 ml of octadecene into a three-necked flask, vaccumizing the flask for 30 min under 120 DEG C., rising the temperature to 290 DEG C. in the atmosphere of nitrogen, when the solution becomes clear, cooling to 270 DEG C.; rapid injecting 8 mmol of tris(trimethylsilyl)phosphine-selenium solution into the three-necked flask, cooling to 240 DEG C. and reacting for 3 min. After the reaction is completed, cleaning the CdSe quantum dot and taking it as a core quantum dot stock solution.

Adding 0.1 mmol of CdSe stock solution, 20 ml of octadecene into 100 ml of the three-necked flask, vaccumizing the flask for 30 min under 120 DEG C., rising the temperature to 280 DEG C. in the atmosphere of nitrogen; starting micro-injection pump under 230 DEG C., injecting aluminum and sulfur precursor solution and oleic acid cadmium solution into the flask, adjusting parameters of injection pump, so that the generated CdS is 2 times by molar weight of CdSe. In whole reaction, aluminum is injected by molar weight according to 0.5-2 times of Cd in CdS. FIG. 1 shows TEM picture of aluminum-doped CdSe/CdS core-shell quantum dot, as shown in the figure, the structure of prepared aluminum-doped CdSe/CdS core-shell quantum dot is regular close to a sphere, and the quantum dot size is distributed evenly.

Embodiment 2

Preparation of Aluminum-Doped CIS/ZnS Core-Shell Structure Quantum Dot

Preparation of CIS core quantum dot: placing 0.5032 mmol of cuprous iodide, 0.5497 mmol of indium acetate, 60 ml of N-dodecyl mercaptan, 40 ml of octadecene and 0.5 ml of oleylamine into 250 ml of three-necked flask. After filling nitrogen for 20 min, heating the temperature to 100 DEG C., keeping the temperature for 1 h until the solution in the flask becomes clear and transparent, rising the temperature to 230 DEG C. with rate of 13 DEG C./min, starting timing, stopping reaction after 1 h, cooling and taking it as core quantum dot stock solution.

Figure 2:
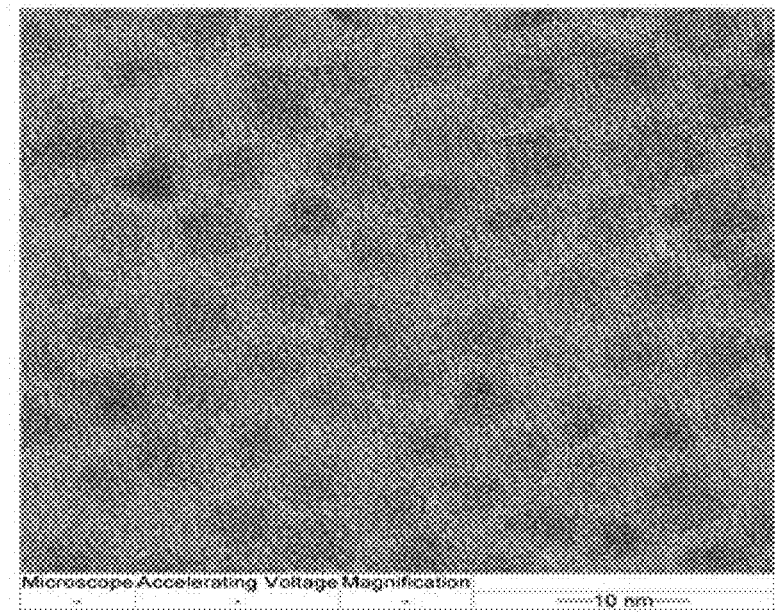
FIG. 2 is TEM picture of aluminum-doped CIS(CuInS$_2$)/ZnS core-shell structure quantum dot.

Adding 0.1 mmol of CIS stock solution, 20 ml of octadecene into 100 ml of the three-necked flask, vaccumizing the flask for 30 min under 120 DEG C. Starting micro-injection pump to 230 DEG C. in the atmosphere of nitrogen, injecting aluminum and sulfur precursor solution and oleic acid zinc solution into the flask, adjusting parameters of injection pump, so that the generated ZnS is 2 times by molar weight of CIS. In whole reaction, aluminum is injected by molar weight according to 0.5-2 times of Zn. FIG. 2 shows TEM picture of aluminum-doped CIS/ZnS core-shell quantum dot, as shown in the figure, the structure of prepared aluminum-doped CIS/ZnS core-shell quantum dot is regular, and the quantum dot size is distributed evenly Embodiment 3

Preparation of Cr-Doped InP/ZnS Core-Shell Structure Quantum Dot

Preparation of InP core quantum dot: placing 0.2 mmol of indium acetate, 8 ml of octadecene, and 0.6 mmol of myristic acid into 100 ml of three-necked flask. After filling nitrogen for 20 min, heating the temperature to 100 DEG C., keeping the temperature for 1 h until the solution in the flask becomes clear and transparent, rising the temperature to 270 DEG C. with rate of 13 DEG C./min, rapid injecting 0.1 mmol of tris(trimethylsilyl)phosphine solution into the three-necked flask, cooling to 250 DEG C. and reacting for 20 min. After the reaction is completed, cleaning the indium phosphide quantum dot and taking it as a core quantum dot stock solution.

Adding 0.1 mmol of InP core quantum dot stock solution, 20 ml of octadecene into 100 ml of three-necked flask, vaccumizing the flask for 30 min under 120 DEG C., starting micro-injection pump to 230 DEG C. in the atmosphere of nitrogen, injecting Cr and sulfur precursor solution and oleic acid zinc solution into the flask, adjusting parameters of injection pump, so that the generated ZnS is 2 times by molar weight of InP. In whole reaction, Cr is injected by molar weight according to 0.5-2 times of Zn. The structure of prepared Cr-doped InP/ZnS core-shell quantum dot is regular, and the quantum dot size is distributed evenly.

Embodiment 4

Figure 3:
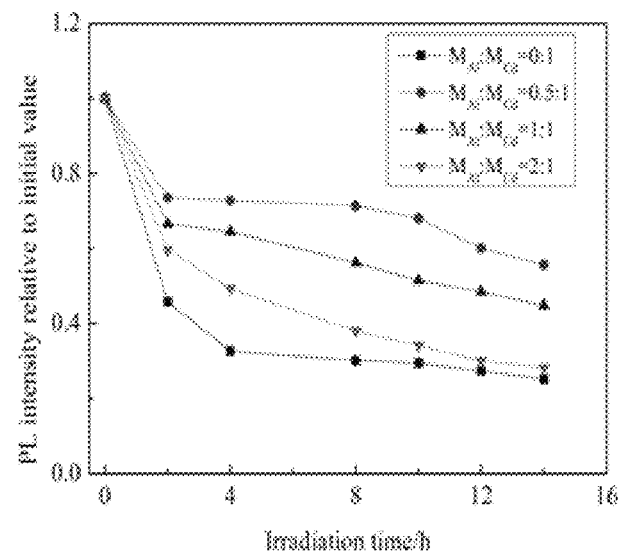
FIG. 3 is fluorescence stability of aluminum-doped CdSe/CdS core-shell structure quantum dot.

Photostablity Test of Aluminum-Doped CdSe/CdS Core-Shell Structure Quantum Dot;

Preparing 450 nm of CdSe/CdS quantum dot and aluminum-doped CdSe/CdS quantum dot toluene solution with 0.1 absorbance and the same coating layer, adding solution of same volume in sealed test bottle respectively, placing the bottle in blue light plane light source (450 nm, Philips) of 0.2 A and 50V (10 W, energy density is 0.35 W/cm$^2$), taking out quantitive sample after a period of time, testing the fluorescence spectrum, integrating and obtaining corresponding fluorescence peak intergral area, and intensity-time decay curve is made by the comparison of the intergral area and initial fluorescence peak intergral area. FIG. 3 shows light decay curve of CdSe/CdS core-shell quantum dot under different molar ratio of aluminum and cadmium. As seen in the figure, compared with undoped CdSe/CdS quantum dot, the stability of aluminum-doped CdSe/CdS quantum dot is improved under different molar ratio of aluminum and cadmium, and when the molar ratio of aluminum and cadmium is 0.5:1, the stability of aluminum-doped CdSe/CdS quantum dot is the best.

Embodiment 5

Figure 4:
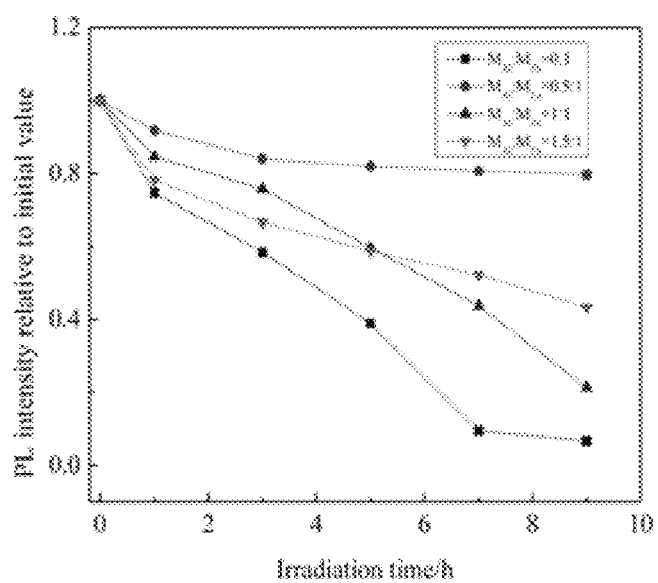
FIG. 4 is fluorescence stability of aluminum-doped CIS/ZnS core-shell structure quantum dot.
Figure 5:
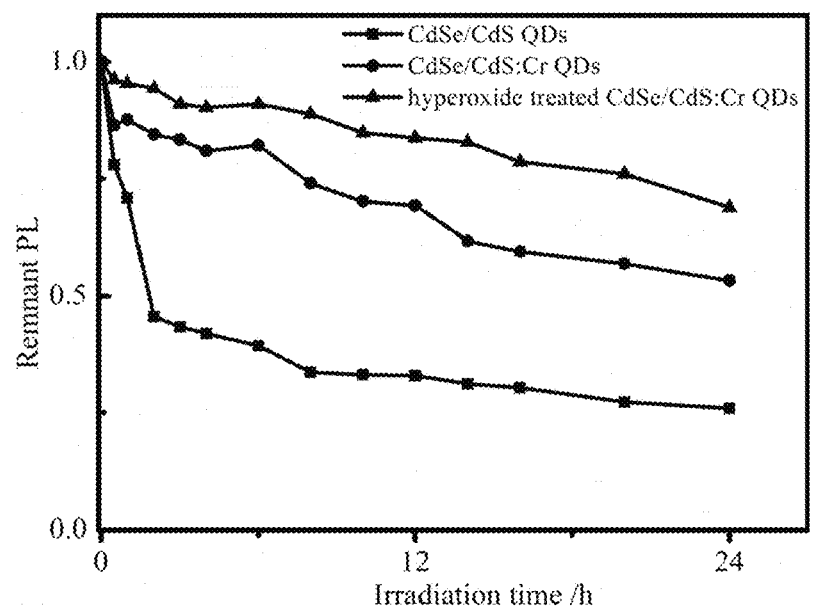
FIG. 5 is fluorescence stability of peroxidating reagent processing chromium-doped CdSe/CdS core-shell structure quantum dot.
Figure 6:
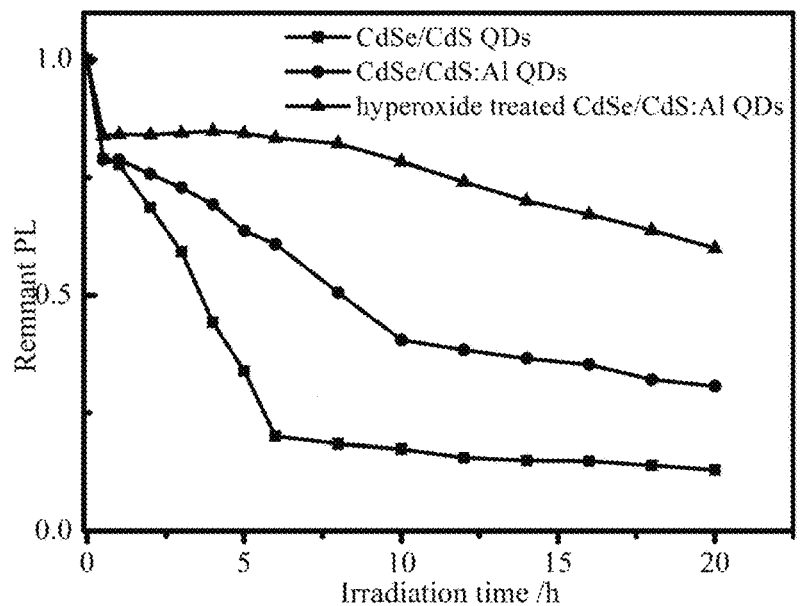
FIG. 6 is fluorescence stability of peroxidating reagent processing aluminum-doped CdSe/CdS core-shell structure quantum dot.

Photostablity Test of Aluminum-Doped CIS/ZnS Core-Shell Structure Quantum Dot;

Preparing 450 nm of CIS/ZnS quantum dot and aluminum-doped CIS/ZnS quantum dot toluene solution with 0.1 absorbance and the same CIS coating layer, adding solution of same volume in sealed test bottle respectively, placing the bottle in blue light plane light source (450 nm, Philips) of 0.2 A and 50V (10 W, energy density is 0.35 W/cm$^2$), taking out quantitive sample after a period of time, testing the fluorescence spectrum, integrating and obtaining corresponding fluorescence peak intergral area, and intensity-time decay curve is made by the comparison of the intergral area and initial fluorescence peak intergral area. FIG. 4 shows light decay curve of CIS/ZnS core-shell quantum dot under different molar ratio of aluminum and zinc. As seen in the figure, compared with undoped/ZnS quantum dot, the stability of CIS aluminum-doped CIS/ZnS quantum dot is improved under different molar ratio of aluminum and zinc, and when the molar ratio of aluminum and zinc is 0.5:1, the stability of aluminum-doped CIS/ZnS quantum dot is the best.

Embodiment 6

Preparation of Fe-Doped CdSe/CdTe Core-Shell Structure Quantum Dot a. Preparation of Quantum Dot CdSe (1) mixing 16 mmol of cadmium oxide, 16 ml of oleic acid and 40 ml of octadecene into a reactor, and vacuumizing the reactor for 50 min under 100 DEG C.;

(2) filling the reactor with nitrogen, rising the temperature to 280 DEG C., when the solution becomes clear, cooling to 270 DEG C.;

(3) rapid injecting trioctylphosphine-selenium solution into the reactor, the molar ratio of the trioctylphosphine-selenium and the cadmium oxide is 1:2, cooling to 240 DEG C., reacting for 3 min, cleaning and obtaining CdSe quantum dot.

b. Preparation of Fe-Doped CdSe/CdTe Core-Shell Structure Quantum Dot (1) adding binary structure quantum dot core CdSe and a solvent octadecene into a reaction vessel, controlling the temperature to be 100 DEG C. and vacuumizing the reaction vessel for 50 min;

(2) filling the reaction vessel with inert gas, and increasing the temperature to 230 DEG C.;

(3) adopting an injection reaction method, injecting a coating material precursor solution (including Fe precursor solution, Cd precursor solution and Te precursor solution) into the reaction vessel for coating the quantum dot core according to the injection amount being 1 times of the quantum dot core to prepare the self-passivating quantum dot.

(4) adopting the same coating material precursor to repeat step (3) for 20 times, a layer of CdTe is coated again outside of the self-passivating quantum dot prepared in step (3), and obtaining two-layer coated Fe-doped CdSe/CdTe core-shell structure quantum dot, and Fe is 0.1 wt % in content.

Embodiment 7

A. the self-passivating quantum dot core is doped with binary structure CdSe is obtained by high temperature injection method, comprising following steps:

(1) adding 16 mmol of cadmium oxide, 16 ml of oleic acid, 1.6 mmol of M isopropoxide and 40 ml of octadecene into a reactor, and vacuumizing the reactor for 30 min under 120 DEG C. (M=Al, Zr, Fe, Ti, Cr, Ta, Si or Ni);

(2) filling the reactor with nitrogen, rising the temperature to 300 DEG C., when the solution becomes clear, cooling to 270 DEG C.;

(3) rapid injecting trioctylphosphine-selenium solution into the reactor, the molar ratio of the trioctylphosphine-selenium and the cadmium oxide is 1:2, cooling to 240 DEG C., reacting for 5 min, cleaning and obtaining aluminum-doped binary structure quantum dot core CdSe.

b. The preparation method of a self-passivating quantum dot, comprising the following steps:

(1) adding M-doped binary structure quantum dot core CdSe and a solvent octadecene into a reaction vessel, controlling the temperature to be 120 DEG C. and vacuumizing the reaction vessel for 30 min;

(2) filling the reaction vessel with inert gas, and rising the temperature to 280 DEG C.;

(3) adopting an injection reaction method, injecting a coating material precursor solution (including Zn precursor solution and S precursor solution) into the reaction vessel for coating the quantum dot core according to the injection amount being 2 times of the quantum dot core to obtain M-doped CdSe/ZnS core-shell structure quantum dot.

(4) adopting different coating material precursor solution containing or containing no M precursor solution (M=Al, Zr, Fe, Ti, Cr, Ta, Si or Ni), 20 layers of coating material are sequentially coated outside of the M-doped CdSe/ZnS core-shell structure quantum dot, the doped M element in each layer of coating material is the same or different, and preparing the self-passivating quantum dot product, and in the product, aluminum is 40 wt % in content, the coating material precursor solution is soluable solution of element comprising coating material.

Embodiment 8

(1) preparing benzoyl peroxide toluene solution with concentration of 0.05 mmol/mL;

(2) adding 100 microliter of 0.05 mmol/mL benzoyl peroxide toluene solution into 2 ml of CdSe/CdS:Cr toluene solution, water bathing for 2 h under 60 DEG C., wherein the concentration of CdSe/CdS:Cr toluene solution is 15 mg/mL;

(3) cleaning CdSe/CdS:Cr quantum dot solution for comparing stability.

Embodiment 9

(1) spin coating CdSe/CdS:Cr toluene solution with concentration of toluene solution on silicon wafer;

(2) putting the silicon wafer into the plasma generator for processing 0.5 h, and dissolving in the toluene solution for stability test.

It should be emphasized that above disclosure are merely some embodiments, and are described for clear understanding the principle of the disclosure, many variations and modifications can be made to above embodiments without departing from the spirit and principle of the disclosure, and these variations and modifications shall be within the scope of the disclosure.

The invention claimed is:

1. A method of producing a self-passivating quantum dot, comprising:
   (1) adding an M precursor comprising a self-passivating element M to a quantum dot core precursor solution to form a quantum dot core doped with M; adding the quantum dot core doped with M and a solvent to a reaction vessel at 100-120° C., and vacuumizing the reaction vessel for 30-50 minutes;
   (2) filling the reaction vessel with inert gas, and rising the temperature to 230-280° C.;
   (3) injecting a coating material precursor solution into the reaction vessel for reaction to produce a self-passivating quantum dot with one layer of coating material, wherein the molar ratio of the coating material precursor solution to the quantum dot core is 1:1 or 2:1; and
   (4) when a coating layer is multilayer, repeating step (3) to continually form the coating material outside of the self-passivating quantum dot prepared in step (3) to produce a self-passivating quantum dot with multilayer coating material;
   wherein the self-passivating element M is selected from the group consisting of Al, Zr, Fe, Ti, Cr, Ta, Ni and Si.

2. The method of claim 1, wherein the self-passivating element M ranges from 0.1-40 wt % based on the self-passivating quantum dot prepared in step (3) or (4).

3. The method of claim 1, wherein the M precursor is selected from the group consisting of M chloride, M bromide, M fluoride, M nitrate, M sulfate, M perchlorate, M phosphate, M acetate, M formate, M oxalate, M propionate, trimethyl M, triethyl M, tripropyl M, triisopropyl M, tributyl M, tri-sec-butyl M, tri-tert-butyl M, tetraisopropyl M, M isopropoxide, M sec-butoxide or M acetylacetonate.

4. The method of claim 3, wherein the M precursor is M isopropoxide or M acetylacetonate.

5. The method of claim 1, wherein the coating material is the same as or different from a material of the quantum dot core.

6. The method of claim 1, wherein a coating layer outside of the quantum dot core comprises 1-20 layers of the coating material.

7. The method of claim 1, wherein the quantum dot core is a binary structure quantum dot core, a ternary quantum dot core or a quaternary structure quantum dot core.

8. The method of claim 7, wherein the binary structure quantum dot core is $A_m X_q$, the ternary structure quantum dot core is $A_m A'_n X_q$, the quaternary structure quantum dot core is $A_m A'_n A''_p X_q$;
   wherein each m, n, p and q are independently integers that are equal to or greater than 1; each A, A' and A" are independently selected from one of cadmium, zinc, mercury, lead, tin, gallium, indium, calcium, barium and copper, and A, A' and A" are different from each other; and X is selected from the group consisting of sulfur, selenium, phosphorus, arsenic, tellurium and antimony.

9. The method of claim 1, wherein the coating material is selected from the group consisting of admium selenide (CdSe), zinc selenide (ZnSe), mercury selenide (HgSe), cadmium sulfide (CdS), zinc sulfide (ZnS), mercury sulfide (HgS), cadmium telluride (CdTe), zinc telluride (ZnTe), mercury telluride (HgTe), gallium nitride (GaN), indium nitride (InN), gallium phosphide (GaP), gallium antimonide (GaSb), indium gallium phosphide (InGaP), zinc cadmium selenide (ZnCdSe) and cadmium zinc sulfide (CdZnS).

10. A method of producing a self-passivating quantum dot, comprising:
    (1) adding a quantum dot core and a solvent to a reaction vessel at 100-120° C., and vacuumizing the reaction vessel for 30-50 minutes;
    (2) filling the reaction vessel with inert gas, and rising the temperature to 230-280° C.;
    (3) injecting a coating material precursor solution doped with an M precursor comprising a self-passivating element M into the reaction vessel for reaction to produce a self-passivating quantum dot with one layer of coating material, wherein the molar ratio of the coating material precursor solution to the quantum dot core is 1:1 or 2:1; and
    (4) when a coating layer is multilayer, repeating step (3) to continually form the coating material outside of the self-passivating quantum dot prepared in step (3) to produce a self-passivating quantum dot with multilayer coating material;

wherein the self-passivating element M is selected from the group consisting of Al, Zr, Fe, Ti, Cr, Ta, Ni and Si.

11. The method of claim 10, wherein the self-passivating element M ranges from 0.1-40 wt % based on the self-passivating quantum dot prepared in step (3) or (4).

12. The method of claim 10, wherein the M precursor is selected from the group consisting of M chloride, M bromide, M fluoride, M nitrate, M sulfate, M perchlorate, M phosphate, M acetate, M formate, M oxalate, M propionate, trimethyl M, triethyl M, tripropyl M, triisopropyl M, tributyl M, tri-sec-butyl M, tri-tert-butyl M, tetraisopropyl M, M isopropoxide, M sec-butoxide or M acetylacetonate.

13. The method of claim 10, wherein the quantum dot core is a binary structure quantum dot core, a ternary quantum dot core or a quaternary structure quantum dot core.

14. The method of claim 13, wherein the binary structure quantum dot core is $A_mX_q$, the ternary structure quantum dot core is $A_mA'_nX_q$, the quaternary structure quantum dot core is $A_mA'_nA''_pX_q$;

wherein each m, n, p and q are independently integers that are equal to or greater than 1; each A, A' and A" are independently selected from one of cadmium, zinc, mercury, lead, tin, gallium, indium, calcium, barium and copper, and A, A' and A" are different from each other; and X is selected from the group consisting of sulfur, selenium, phosphorus, arsenic, tellurium and antimony.

15. The method of claim 10, wherein the coating material is selected from the group consisting of admium selenide (CdSe), zinc selenide (ZnSe), mercury selenide (HgSe), cadmium sulfide (CdS), zinc sulfide (ZnS), mercury sulfide (HgS), cadmium telluride (CdTe), zinc telluride (ZnTe), mercury telluride (HgTe), gallium nitride (GaN), indium nitride (InN), gallium phosphide (GaP), gallium antimonide (GaSb), indium gallium phosphide (InGaP), zinc cadmium selenide (ZnCdSe) and cadmium zinc sulfide (CdZnS).

* * * * *